(12) United States Patent
Hou et al.

(10) Patent No.: US 10,606,547 B2
(45) Date of Patent: Mar. 31, 2020

(54) ELECTRONIC DEVICE

(71) Applicant: Airoha Technology Corp., Hsinchu (TW)

(72) Inventors: Wen-Sheng Hou, Taoyuan (TW); Heng-Chih Lin, Hsinchu (TW); Chien-Chen Lin, Hsinchu County (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 140 days.

(21) Appl. No.: 15/239,902

(22) Filed: Aug. 18, 2016

(65) Prior Publication Data
US 2017/0185372 A1 Jun. 29, 2017

(30) Foreign Application Priority Data

Dec. 23, 2015 (TW) .............................. 104143404 A

(51) Int. Cl.
*A63H 13/00* (2006.01)
*G06F 3/16* (2006.01)
(Continued)

(52) U.S. Cl.
CPC .............. *G06F 3/165* (2013.01); *G05B 11/01* (2013.01); *G05B 19/042* (2013.01); *G05B 19/0428* (2013.01); *G10L 25/48* (2013.01); *G05B 2219/23249* (2013.01); *G05B 2219/23386* (2013.01)

(58) Field of Classification Search
CPC ...... A63H 2200/00; A63H 5/00; A63H 13/00; A63H 3/20; G10H 1/368; G10H 2210/076
See application file for complete search history.

(56) References Cited

U.S. PATENT DOCUMENTS 6,390,881 B1 * 5/2002 Yu ........................ A63H 13/04
40/414
7,179,984 B2   2/2007 Nishitani et al.
(Continued)

FOREIGN PATENT DOCUMENTS

CN    101869718 A    10/2010
CN    202150930 U     2/2012
(Continued)

OTHER PUBLICATIONS

TIPO Office Action dated Jun. 2, 2016 in corresponding Taiwan application (No. 104143404) with partial English translation on pp. 1-4.
(Continued)

*Primary Examiner* — Thomas H Maung
(74) *Attorney, Agent, or Firm* — McClure, Qualey & Rodack, LLP

(57) ABSTRACT

An electronic device includes an audio reception circuit, a processing circuit and at least one movable component. The audio reception circuit receives an audio data. The processing circuit performs an audio feature analysis on the audio data to obtain audio feature data, and determines a corresponding action event according to audio feature data to generate an action control signal corresponding to the action event. The movable component performs the action event in response to the action control signal.

8 Claims, 4 Drawing Sheets

(51) Int. Cl.
*G05B 19/042* (2006.01)
*G05B 11/01* (2006.01)
*G10L 25/48* (2013.01)

(56) References Cited

U.S. PATENT DOCUMENTS

| | | | |
|---|---|---|---|
| 8,324,492 B2 | 12/2012 | Feeney et al. | |
| 8,354,918 B2 | 1/2013 | Boyer | |
| 8,742,243 B2 | 6/2014 | Wang et al. | |
| 2009/0280717 A1* | 11/2009 | Chan | A63H 11/00 446/175 |
| 2011/0143631 A1* | 6/2011 | Lipman | A63H 3/28 446/175 |
| 2012/0132056 A1* | 5/2012 | Wang | G06F 17/30743 84/609 |
| 2013/0309935 A1* | 11/2013 | Olson | A63H 3/20 446/330 |
| 2014/0220856 A1 | 8/2014 | Last et al. | |
| 2014/0249673 A1 | 9/2014 | Lin | |

FOREIGN PATENT DOCUMENTS

| | | |
|---|---|---|
| CN | 102479509 A | 5/2012 |
| TW | M291834 U | 6/2006 |
| TW | 201409281 A | 3/2014 |
| TW | 201434600 A | 9/2014 |
| TW | 201503107 A | 1/2015 |
| TW | 201525770 A | 7/2015 |
| WO | 2013055025 A1 | 4/2013 |

OTHER PUBLICATIONS

TIPO Office Action dated Dec. 19, 2017 in corresponding Taiwan application (No. 104143404).
CN Office Action dated Dec. 3, 2019 in Chinese application (No. 201610037310.X).

* cited by examiner

ELECTRONIC DEVICE

This application claims the benefit of Taiwan application Serial No. 104143404, filed Dec. 23, 2015, the subject matter of which is incorporated herein by reference.

BACKGROUND OF THE INVENTION

Field of the Invention

The invention relates in general to an electronic device, and more particularly to an electronic device capable of generating an action feedback in response to an external audio.

Description of the Related Art

The puppets currently available in the market can perform a series of predetermined actions such as dancing or spinning along with the playing of music. Conventionally, such types of puppets need to store pre-recorded music. When music is played, a pre-determined control signal is triggered to drive the puppets to start performance. However, such types of puppets can only provide fixed performance combined with pre-recorded music, and therefore can only bring limited entertainment experience to the users.

Therefore, it has become a prominent task for the industries to provide a device capable of automatically generating a corresponding action feedback in response to an external audio.

SUMMARY OF THE INVENTION

The invention is directed to an electronic device capable of analyzing unknown music and performing a corresponding action according to the analysis result of the music to complete an improvisational performance matching the scenario of the music.

According to one embodiment of the invention, an electronic device capable of generating an action feedback in response to an external audio is provided. The electronic device includes an audio reception circuit, a processing circuit and at least one movable component. The audio reception circuit receives an audio data. The processing circuit performs an audio feature analysis on the audio data to obtain audio feature data, and determines a corresponding action event according to audio feature data to generate an action control signal corresponding to the action event. The movable component performs the action event in response to the action control signal.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
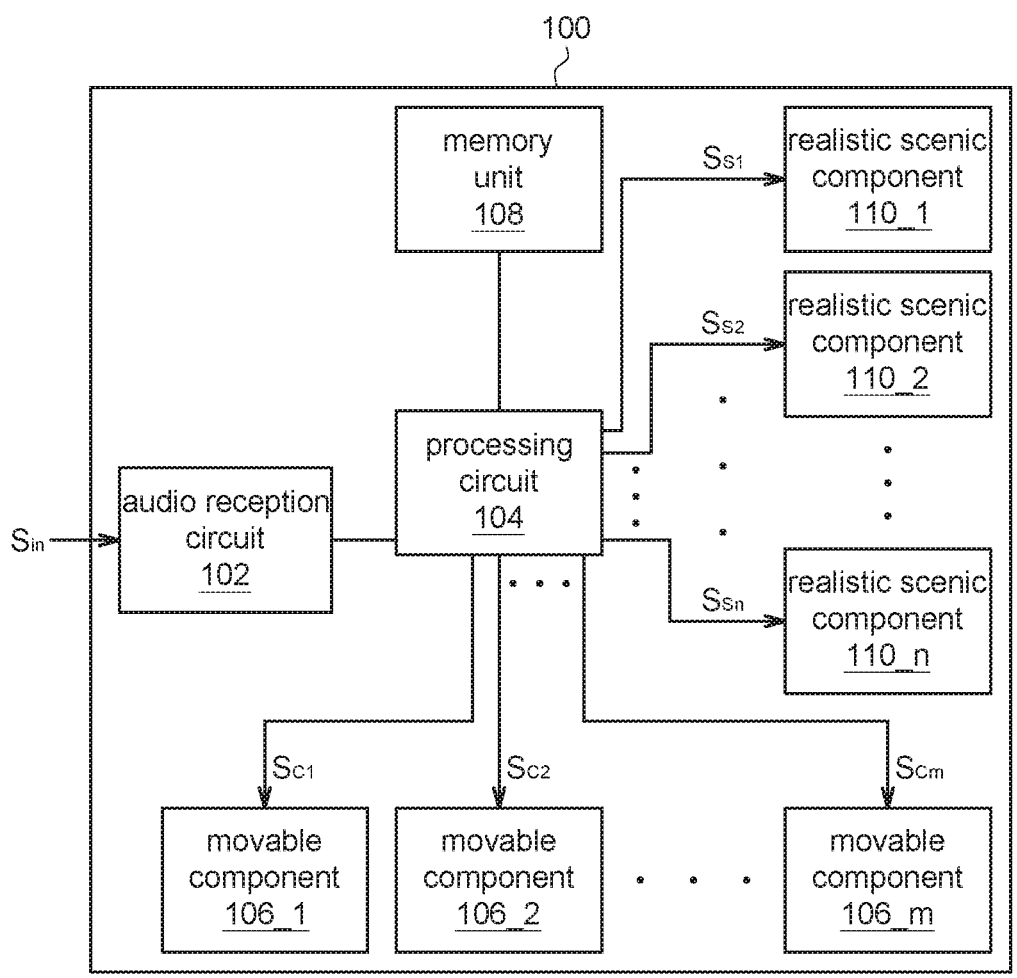
FIG. 1 is a block diagram of an electronic device capable of generating an action feedback in response to an external audio according to an embodiment of the present disclosure.

In the specification, some embodiments of the present disclosure are described with reference to accompanying drawings. It should be noted that not all embodiments are illustrated in accompanying drawings. In fact, the present disclosure can have different variations and is not limited to the embodiments exemplified below. Relatively, the present disclosure provides a number of embodiments to satisfy the legal requirements in regard of application. Identical designations are used in the drawings to indicate identical or similar elements.

FIG. 1 is a block diagram of an electronic device 100 capable of generating an action feedback in response to an external audio according to an embodiment of the present disclosure. The electronic device 100 can be realized by such as a puppet. The electronic device 100 mainly includes an audio reception circuit 102, a processing circuit 104 and one or plural movable components $106\_1 \sim 106\_m$, herein m is a positive integer (hereinafter the movable components $106\_1 \sim 106\_m$ are collectively referred as the movable component 106 unless otherwise specified). The audio reception circuit 102 can be realized by such as a sound receiver, a data transmission port (such as a USB port), a wireless transmission receiver (such as Bluetooth device) or any other form of receiver. The processing circuit 104 can be realized by such as a microprocessor, a microcontroller, a special purpose application circuit or any other arithmetic control circuit. The movable component 106 can be realized by such as a movable mechanism assembly. When the electronic device 100 is a figurine puppet, the movable component 106 can be such as the limbs or the head of the figurine puppet.

The audio reception circuit 102 receives audio data $S_{in}$. The audio data $S_{in}$ can be any segment of music or audio signal not built in the electronic device 100, and can be obtained through a radio device or directly loaded from an mp3 file or can be a multimedia file received from a wireless transmission receiver.

The processing circuit 104 performs an audio feature analysis on the audio data $S_{in}$ to obtain audio feature data, and determines a corresponding action event according to the audio feature data to generate action control signals $S_{C1} \sim C_{Cm}$ corresponding to the action event (hereinafter the action control signals are collectively referred as the action control signal $S_C$ unless otherwise specified). Here, the audio feature analysis can be any analysis algorithm in the field of signal processing, such as Fourier analysis or correlation analysis, suitable for capturing the information of signal features. In an embodiment, the processing circuit 104 can create audio feature data through the analysis of at least one of the volume change and the pitch change of the audio data $S_C$.

Based on the created audio feature data, the processing circuit 104 can select a corresponding action event through database comparison or an in-built algorithm and generate the action control signal $S_C$, and the movable component 106 will perform the action event in response to the action control signal $S_C$. Suppose the movable components $106\_1$ and $106\_2$ respectively are the hands and the upper body of a figurine puppet. When the analysis shows that the audio data $S_{in}$ is fast-paced music, and the action event selected by the processing circuit 104 through database comparison or an in-built algorithm is hand waving and body spinning, the processing circuit 104 will generate the action control signal $S_{C1}$ to control the movable component 106_1 to perform fast bobbing and generate an action control signal $S_{C2}$ to control the movable component 106_2 to spin. In other words, regarding an action event, the processing circuit 104 can transmit a corresponding action control signal $S_C$ to one or plural relevant movable components 106 to complete the action event. In an embodiment, the component swing amplitude and/or the component action speed generated when the movable component 106 performs the action event are determined according to the volume change and/or the pitch change of the audio data $S_{in}$.

The electronic device 100 may selectively include a memory unit 108. The memory unit 108 can be realized by such as a database, a look-up table or any types of non-volatile memory for storing plural items of pre-determined audio feature data and plural corresponding pre-determined action events. Suppose the pre-determined audio feature data respectively correspond to different paces (such as fast pace, slow pace, and so on), the memory unit 108 will store the action events corresponding to different paces. For example, fast pace corresponds to fast limb waving, and slow pace corresponds to body spinning. After obtaining the audio feature data, the processing circuit 104 will locate an item of pre-determined audio feature data closet to the obtained audio feature data from the memory unit 108 to generate an action control signal $S_C$ based on the corresponding pre-determined action event.

In an embodiment, the electronic device 100 may selectively include one or plural realistic scenic components 110_1~110_n, wherein n is a positive integer (hereinafter the realistic scenic components 110_1~110_n are collectively referred as the realistic scenic component 110 unless otherwise specified). The realistic scenic components 110_1~110_n respectively perform realistic scenic special effects in response to the realistic scenic control signals $S_{S1}$~$S_{Sn}$ (hereinafter the realistic scenic control signal $S_{S1}$~$S_{Sn}$ are collectively referred as the realistic scenic control signal $S_S$ unless otherwise specified). The realistic scenic special effect can be a lighting change, an analog water dance change, an analog torch change or any special effects of the scenes. Suppose the realistic scenic components 110_1 and 110_2 respectively are the special effect components for performing the lighting change and the water dance change. When the audio feature data shows that the audio data $S_{in}$ corresponds to a slow-paced melody, and the action events selected by the processing circuit 104 through database comparison or in-built algorithm are gradually changing the lighting and generating a special effect of water dance, the processing circuit 104 will generate a realistic scenic control signal $S_{S1}$ to control the realistic scenic component 110_1 to slowly change the light colors and generate a realistic scenic control signal $S_{S2}$ to control the realistic scenic component 110_2 to generate a special effect of water dance.

According to the realistic scenic special effect that need to be presented, the realistic scenic component 110 can be realized by different elements of special effects or a combination thereof, such as LED lamps, smoke generators, buzzers and so on. In an embodiment, the correspondence relationship between the action event corresponding to the realistic scenic component 110 and the audio feature data is stored in the memory unit 108.

Figure 2:
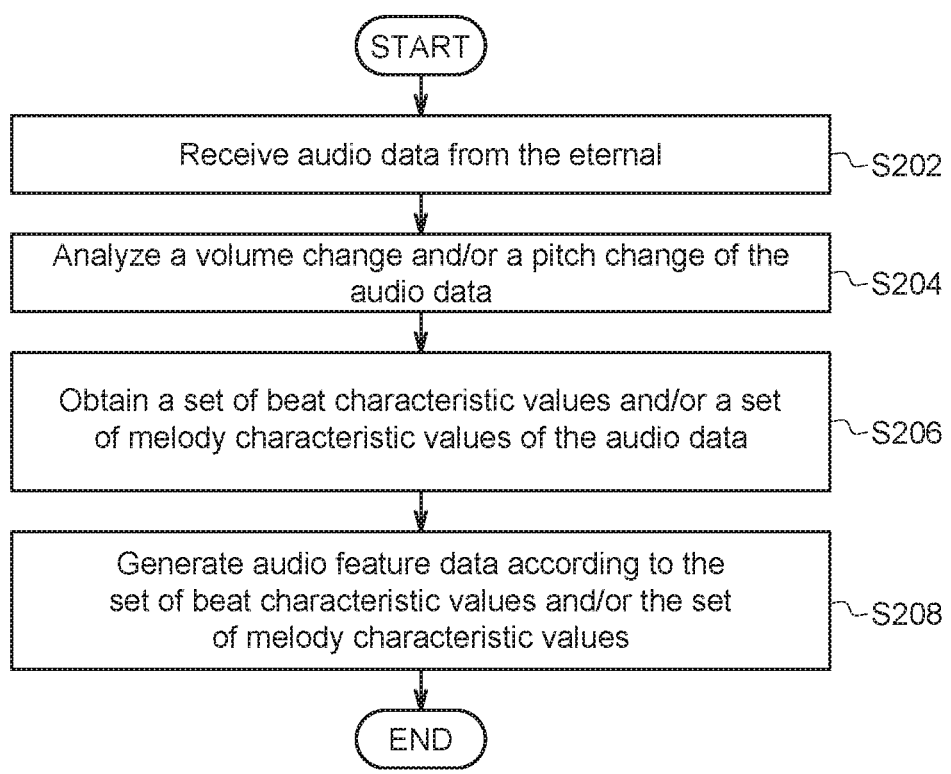
FIG. 2 is an example of a flowchart of a method for creating audio feature data using an electronic device according to an embodiment of the present disclosure.

FIG. 2 is an example of a flowchart of a method for creating audio feature data using an electronic device 100 according to an embodiment of the present disclosure.

In step S202, the audio reception circuit 102 receives audio data $S_{in}$ from the eternal. The audio data $S_{in}$ can be any segment of audio, and does not have to be any known music built in the electronic device 100 or stored in the database of the electronic device 100.

In step S204, the processing circuit 104 analyzes a volume change and/or a pitch change of the audio data $S_{in}$. For example, the processing circuit 104 can determine the volume change and the pitch change according to the wave change of the audio data $S_{in}$ on the time domain or the frequency domain.

In step S206, the processing circuit 104 obtains a set of beat characteristic values and/or a set of melody characteristic values of the audio data $S_{in}$. For example, the processing circuit 104 captures the turning point, at which the wave of the audio data $S_C$ on the time domain has significant change, to obtain the pace information of the audio data $S_C$ and accordingly create a corresponding set of beat characteristic values. On the other hand, the processing circuit 104 analyzes the main distribution region of the audio data $S_C$ on the spectrum to obtain the melody information of the audio data $S_C$ and accordingly create a corresponding set of melody characteristic values.

In step S208, the processing circuit 104 generates audio feature data according to the set of beat characteristic values and/or the set of melody characteristic values. The generated audio feature data can be compared with the pre-determined audio feature data of the memory unit 108 to locate an item of most similar or best matched audio feature data and accordingly locate an action event corresponding to the audio feature data. Or, the processing circuit 104 can process the audio feature data using an in-built algorithm to determine the corresponding action event.

It should be noted that the present disclosure is not limited to the above exemplifications. Apart from being defined by the beat and the melody feature of audio data $S_i$ as disclosed above, the audio feature data can also be defined by any characteristic parameter of the audio data $S_{in}$ or a combination thereof, and the action event can be determined according to the style or the performance type of the puppet.

Figure 3:
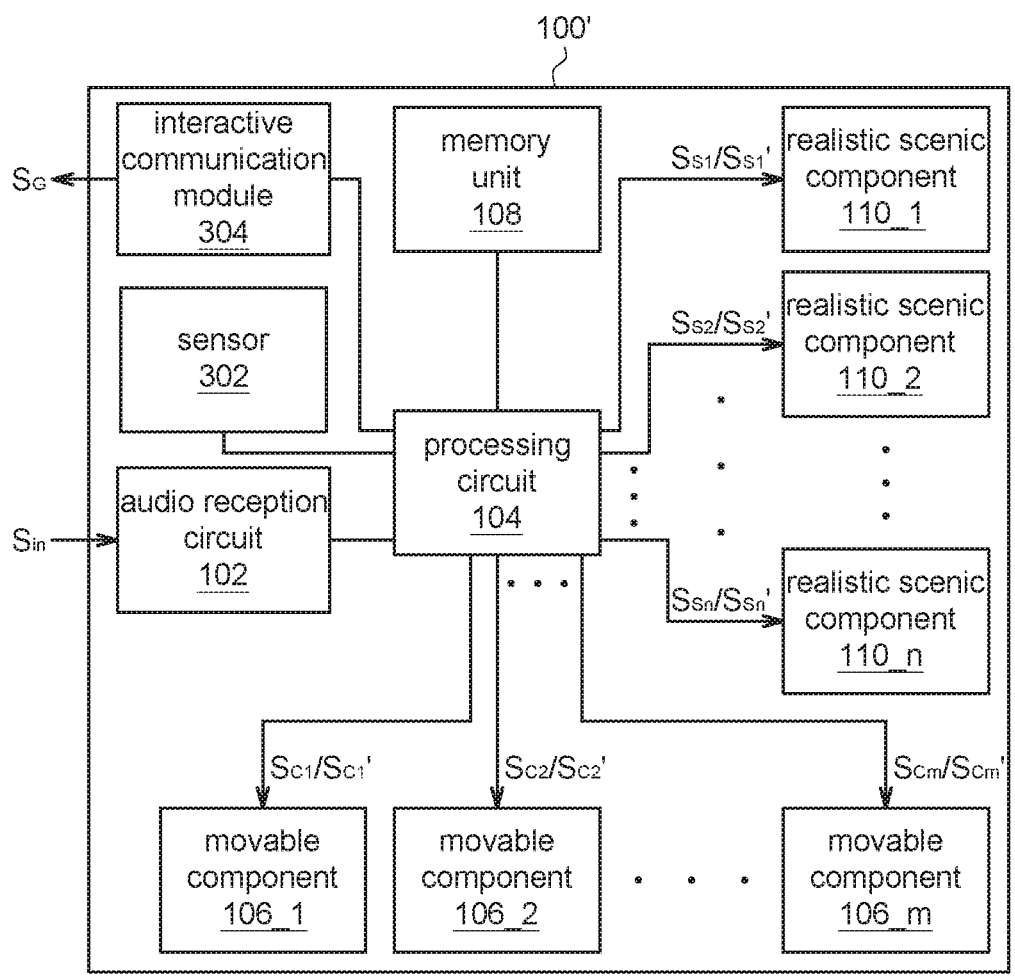
FIG. 3 is a block diagram of an electronic device capable of generating an action feedback in response to an external audio according to another embodiment of the present disclosure.

FIG. 3 is a block diagram of an electronic device 100' capable of generating an action feedback in response to an external audio according to another embodiment of the present disclosure. In comparison to the electronic device 100 disclosed above, the electronic device 100' further includes a sensor 302. For the convenience of understanding and explanations, identical designations are used to indicate identical or similar elements.

The sensor 302 can be any types of distance/position sensor capable of detecting relative position information of one or plural other electronic devices. The electronic device 100' can perform an interactive event or a performance such as pas de deux, group dance or live band music using the measured relative position information and other electronic devices.

In an embodiment, when the sensor 302 detects other electronic devices or detects that the quantity of other electronic devices is over a limit, the processing circuit 104 will trigger a multi-player mode, such that the electronic device 100' can enter the multi-player mode. When the electronic device 100' enters the multi-player mode, the processing circuit 104 will generate an interactive control signal according to the audio feature data and the measured relative position information, such that the movable component 106 and/or the realistic scenic component 110 can perform the interactive event with other electronic devices. As indicated in FIG. 3, the interactive control signals corresponding to the movable components 106_1~106_m respectively are interactive control signals $S_{C1}'$~$S_{Cm}'$, and the interactive control signals corresponding to the realistic scenic components 110_1~110_n respectively are interactive control signals $S_{S1}'$~$S_{Sn}'$.

Using the same audio data $S_{in}$, the feedback action generated by the electronic device 100' under a multi-player mode could be different from that generated under a non-multi-player mode (that is, a single mode). For example, when the electronic device 100' is in a single mode, the movable component 106_1 will perform an action event, such as bobbing, in response to the action control signal $S_{C1}$. When the electronic device 100' enters a multi-player mode, the movable component 106_1 will perform an interactive event, such as left and right spinning, in response to the interactive control signal $S_{C1}'$. Generally speaking, when the electronic device 100' and other electronic devices enter the multi-player mode, the electronic devices will form a group and together perform the interactive event through division of labor in response to the audio data $S_{in}$.

In an embodiment, the electronic device 100' may selectively include an interactive communication module 304, which can be realized by such as a wireless signal transceiver circuit. The interactive communication module 304 can communicate with other electronic devices through ultra-red light, Bluetooth or other short distance communication technology.

The interactive communication module 304 can transmit an interactive group signal $S_G$ corresponding to an interactive event to other electronic device to control other electronic devices to perform an interactive event together. In an embodiment, the interactive event may include one or plural sub-events, each corresponding to a device identification code. Meanwhile, regarding the interactive event, through the transmission of the interactive group signal $S_G$, the electronic device 100' can communicate the device identification code and the information of the sub-event with the other electronic devices to generate a corresponding interactive control signal to control relevant movable component 106 and/or realistic scenic component 110 (if any). For example, if the interactive event is a group performance, then the sub-event may include actions such as playing piano, beating drums, and playing wind instruments. Each sub-event corresponds to a device identification code, and is performed by an electronic device having a matched device identification code. The distribution of the device identification codes can be determined by each electronic device according to its relative position information or the setting when the electronic device leaves the factory.

Figure 4:
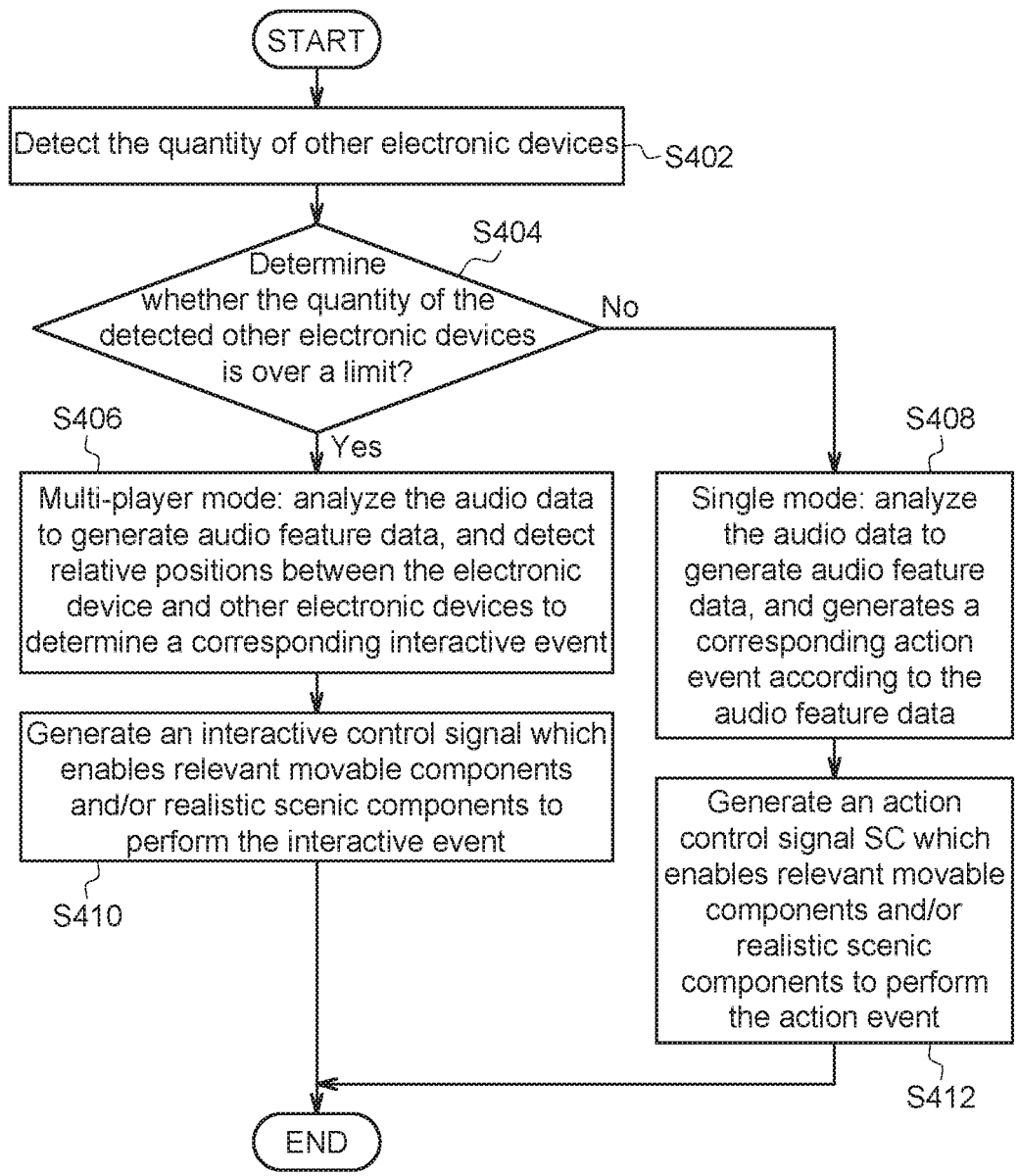
FIG. 4 is an example of operational flowchart of an electronic device equipped with multi-player interactive features according to an embodiment of the present disclosure.

FIG. 4 is an example of operational flowchart of an electronic device (such as electronic device 100') equipped with multi-player interactive features according to an embodiment of the present disclosure.

In step S402, the electronic device detects the quantity of other electronic devices.

In step S404, the electronic device determines whether the quantity of the detected other electronic devices is over a limit. For example, if the detection result shows that the quantity of other electronic devices around the electronic device is over a certain quantity, then the method proceeds to step S406, the electronic device enters a multi-player mode. Conversely, if the detection result shows that no other electronic devices are around the electronic device or the quantity of detected other electronic devices is lower than a certain quantity, then the electronic device enters a single mode as indicated in step S408.

Under the multi-player mode as indicated in step S406, the electronic device analyzes the audio data to generate audio feature data, and detects relative positions between the electronic device and other electronic devices to determine a corresponding interactive event. Then, the method proceeds to step S410, the electronic device generates an interactive control signal which enables relevant movable components and/or realistic scenic components to perform the interactive event.

Under the single mode as indicated in step S408, the electronic device analyzes the audio data to generate audio feature data, and generates a corresponding action event according to the audio feature data. Then, the method proceeds to step S412, the electronic device generates an action control signal $S_C$ which enables relevant movable components and/or realistic scenic components to perform the action event.

As disclosed above, the electronic device of the present disclosure is capable of analyzing unknown music and performing a corresponding action and/or realistic scenic special effect according to the analysis result of the music to complete an improvisational performance matching the scenario of the music. Besides, the electronic device of the present disclosure can further interact with other electronic devices to complete the interactive event together in response to the music, such that the entertainment effect of the device can be improved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device capable of generating an action feedback, wherein the electronic device comprises:
   an audio reception circuit for receiving an audio data;
   a processing circuit for performing an audio feature analysis on the audio data to obtain audio feature data, and determining a corresponding action event according to the audio feature data to generate an action control signal corresponding to the action event;
   at least one movable component for performing the action event in response to the action control signal;
   a realistic scenic component for performing a realistic scenic special effect in response to a realistic scenic control signal; and
   wherein the realistic scenic control signal corresponding to the action event is generated by the processing circuit, the realistic scenic special effect comprises at least one of analog water dance change or analog torch change, and the analog water dance change is generated through changing a light color by the processing circuit;
   wherein the electronic device determines whether a quantity of other electronic devices is over a limit if the quantity of other electronic devices is over the limit, then the electronic device enters a multi-player interactive mode; if the quantity of other electronic devices is not over the limit, then the electronic device enters a single mode;

using the same audio data, a feedback action generated by the electronic device under the multi-player interactive mode is different from that generated under the single mode.

2. The electronic device according to claim 1, further comprising:
a memory unit for storing a plurality of pre-determined audio feature data and a plurality of corresponding pre-determined action events.

3. The electronic device according to claim 1, wherein the processing circuit analyzes at least one of a volume change and a pitch change of the audio data to create the audio feature data.

4. The electronic device according to claim 3, wherein the processing circuit obtains a set of beat characteristic values and a set of melody characteristic values of the audio data according to the volume change and the pitch change of the audio data respectively, and generates the audio feature data based on the set of beat characteristic values and the set of melody characteristic values.

5. The electronic device according to claim 3, wherein at least one of a component swing amplitude and a component action speed generated when the at least one movable component performs the action event is determined according to at least one of the volume change and the pitch change.

6. The electronic device according to claim 1, further comprising:
a sensor for detecting relative position information of one or plural other electronic devices;
wherein when the electronic device enters the multi-player interactive mode, the processing circuit generates an interactive control signal according to the audio feature data and the relative position information, such that the at least one movable component and the one or plural other electronic devices perform an interactive event.

7. The electronic device according to claim 6, further comprising:
an interactive communication module for transmitting an interactive group signal corresponding to the interactive event to the one or plural other electronic devices to control the one or plural other electronic devices to perform the interactive event together.

8. The electronic device according to claim 6, wherein when the sensor detects the one or plural other electronic devices, the processing circuit triggers the multi-player interactive mode, such that the electronic device enters the multi-player interactive mode.

* * * * *